United States Patent
Nagata et al.

(10) Patent No.: US 6,181,680 B1
(45) Date of Patent: Jan. 30, 2001

(54) COMMUNICATION MONITORING IN ATM SWITCH

(75) Inventors: Tatsuya Nagata; Kazuhiro Ozawa, both of Nagoya (JP)

(73) Assignee: Fujitsu Limited, Kawasaki (JP)

( * ) Notice: Under 35 U.S.C. 154(b), the term of this patent shall be extended for 0 days.

(21) Appl. No.: 08/753,374

(22) Filed: Nov. 25, 1996

(30) Foreign Application Priority Data

Mar. 1, 1996 (JP) .................................................. 8-044687

(51) Int. Cl.⁷ .................................................. H04L 12/26
(52) U.S. Cl. .............................................. 370/248; 370/250
(58) Field of Search .................................. 370/241, 242, 370/244, 247, 248, 249, 250, 251, 252, 253, 216, 225, 227, 228, 395, 396, 398

(56) References Cited

U.S. PATENT DOCUMENTS

| | | | |
|---|---|---|---|
| 5,173,689 | * 12/1992 | Kusano ................................. | 340/827 |
| 5,343,462 | * 8/1994 | Sekihata et al. ...................... | 370/244 |
| 5,461,607 | * 10/1995 | Miyagi et al. ........................ | 370/244 |
| 5,550,821 | * 8/1996 | Akiyoshi ............................... | 370/397 |
| 5,553,057 | * 9/1996 | Nakayama ........................... | 370/241 |
| 5,610,913 | * 3/1997 | Tomonaga et al. .................. | 370/219 |
| 5,659,540 | * 8/1997 | Chen et al. ........................... | 370/249 |
| 5,675,578 | * 10/1997 | Gruber et al. ........................ | 370/248 |
| 5,675,587 | * 10/1997 | Okuyama et al. ................... | 371/20.1 |
| 5,717,858 | * 2/1998 | Shtayer et al. ....................... | 370/229 |
| 5,719,863 | * 2/1998 | Hummel ................................ | 370/392 |
| 5,737,338 | * 4/1998 | Eguchi et al. ........................ | 714/716 |
| 5,751,698 | * 5/1998 | Cushman et al. .................... | 370/252 |
| 5,872,770 | * 2/1999 | Park et al. ............................ | 370/249 |

\* cited by examiner

Primary Examiner—Chi H. Pham
Assistant Examiner—Kwang B. Yao
(74) Attorney, Agent, or Firm—Helfgott & Karas, P.C.

(57) ABSTRACT

In an ATM switch, after a communication path is properly set up, a continuity test is performed by passing an OAM cell through the communication path before initiating the transmission of user cells. After the transmission of user cells is initiated, a loopback test is performed by periodically inserting an OAM cell in a user cell flow. When a fault condition is detected as a result of the OAM cell loopback test, a peak cell rate environment is created by adding OAM cells to the user cells for a limited period of time, and communication quality is measured under the thus created environment. When a point-to-multipoint connection with a plurality of leaf points is set up, correspondence between each leaf point and a physical connection point is recorded in a table. When a loopback test to a specific leaf point is requested from a maintenance console, an ATM line control unit corresponding to the specific leaf point is determined by referring to the table, and transmission of the OAM cell is allowed only through that ATM line control unit. In this way, an OAM cell loopback test to a specific leaf point can be accomplished.

14 Claims, 7 Drawing Sheets

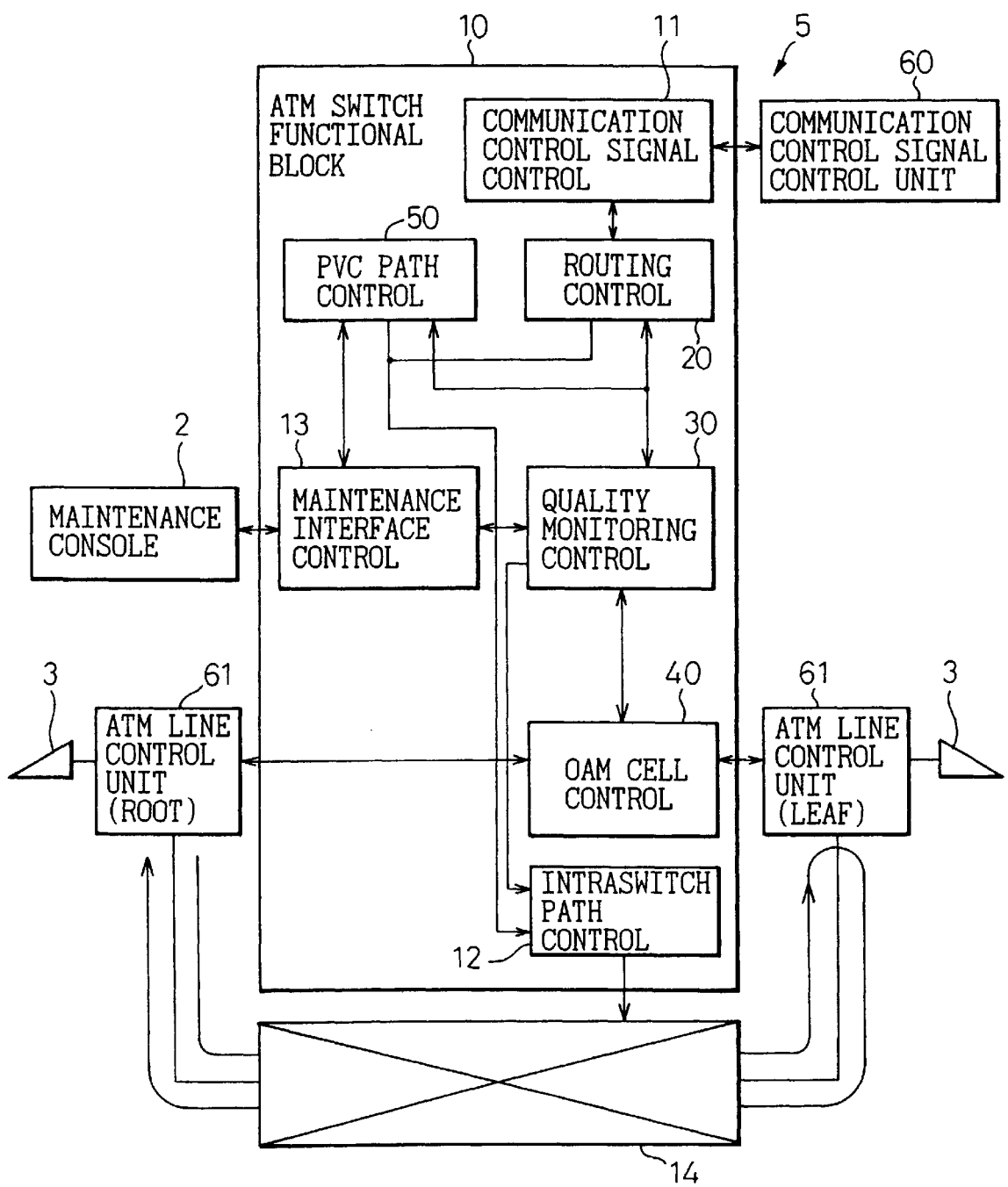

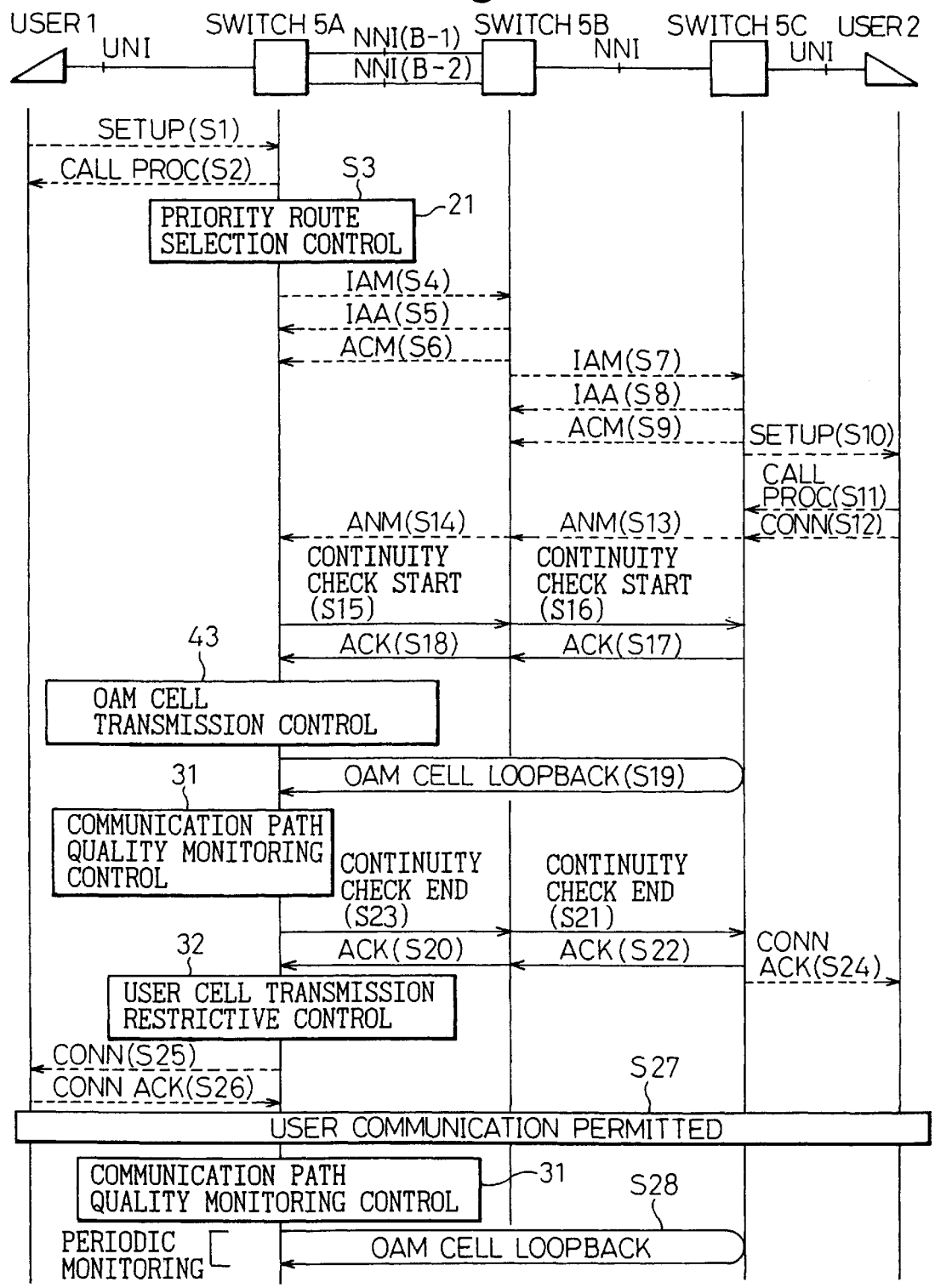

COMMUNICATION MONITORING IN ATM SWITCH

BACKGROUND OF THE INVENTION

1. Field of the Invention

The present invention relates to monitoring the communication quality of a communication path set up by an ATM (Asynchronous Transfer Mode) switch that provides, in addition to virtual connection (VC) service, permanent VC (PVC) service and point-to-multipoint connections.

2. Description of the Related Art

In the VC service, an intraswitch communication path to a destination terminal and, when necessary, a communication path to other switches, is set up in response to a request from an originating terminal. In the PVC service, an intraswitch communication path and an interswitch communication path are set up in accordance with an input to a maintenance console connected to the switch.

In a conventional ATM switch, when setting up a VC communication path, transmission of user cells through the communication path is permitted when the connection result of a communication control signal and the result of the processing of the communication path setup within the switch are normal. Whether the communication path is functioning normally is checked by inserting an OAM (Operations, Administration, and Maintenance) cell during the transmission of user cells after the communication is started. On the other hand, when setting up a PVC communication path, transmission of user cells through the communication path is permitted when the result of the processing of the communication path setup within the switch is normal. Whether the communication path is functioning properly is checked by inserting an OAM cell during the transmission of user cells after the communication is started.

Accordingly, since cell flow verification is not performed when setting up a VC communication path, there may arise situations where cells are not actually flowing within the ATM switch even though the communication path has been established and permitted for use by the user, or where cells are not flowing through a line between ATM switches. Such situations cannot be identified until a fault condition is detected by on-demand transmission of an OAM cell after the communication path has been established. The need therefore arises for a method that can verify cell flow when setting up a VC communication path. For the PVC service also, as in the VC service, a method becomes necessary that can verify cell flow when setting up a communication path.

Further, once the communication path has been set up, cell flow quality of the communication path is monitored by monitoring the condition of user cell flow by using a performance monitoring (PM) function, etc. However, in the conventional system, since OAM cells are sent out only in a sporadic manner, it has not been possible to determine whether the quality of service (QOS) defined as statistic parameters such as cell loss ratio is satisfied or not. Furthermore, if a deterioration of the cell flow quality of the communication path has been detected by a sporadic OAM cell transmission test, the function has been only to notify system administrator, and the result of the detection has not been reflected in the selection of a new route, giving rise to the possibility of routing a new path along the same line that includes the deteriorated path, and resulting in quality degradation also on the new path. Moreover, there have been cases where, when a PVC is attempted to be set up along that route, the PVC is set up as attempted, leading thereafter to quality degradation on the communication path thus set up.

With ATM switches, a point-to-multipoint communication path connection function is provided for implementing a video-on-demand (VOD) service (a service that delivers information from the source to a subscriber on demand). In VOD, communication service is provided to a subscriber upon the subscriber newly registering for the VOD service.

In conventional ATM switches, for a point-to-multipoint communication path, only a test cell continuity check function to check continuity within the ATM switch providing the point-to-multipoint connection, and an OAM cell loopback test function to perform a loopback test from a root-side subscriber to a root-side path connection point of the ATM switch providing the point-to-multipoint connection, and from a leaf-side ATM switch to a leaf-side path connection point of the ATM switch providing the point-to-multipoint connection, have been provided separately, and it has not been possible to perform a cell continuity test from a root-side path connection point of the ATM switch providing the point-to-multipoint connection to a subscriber-side path connection point of the ATM switch accommodating a leaf-side subscriber. Accordingly, when locating a fault that has occurred on a point-to-multipoint communication path, or when performing a cell flow check on a communication path added on the leaf side, it has been necessary to perform two patterns of test, one within the ATM switch providing the point-to-multipoint connection (between the root-side path connection point and each of the leaf-side path connection points) and the other between each of the leaf-side path connection points of the ATM switch providing the point-to-multipoint connection and the leaf-side ATM switch. This has complicated maintenance work.

Furthermore, in conventional ATM switches, for a communication path of a dual configuration, an OAM cell loopback test function has been provided only for the communication path currently used for communication (working communication path), and an OAM cell loopback test function for a spare communication path (protection communication path) has not been provided. As a result, when switching is made in the dual communication path to the protection path because of a failure of the working path, continuity may not be achieved since the quality of the protection path has not been checked periodically.

SUMMARY OF THE INVENTION

In view of the above-outlined problems, it is an object of the present invention to provide a method and apparatus for communication monitoring in an ATM switch, that can achieve reliable cell flow in an ATM switch system.

According to the present invention, there is provided a communication monitoring method for a cell switching machine, comprising the steps of: setting up a virtual communication path, including a path within the cell switching machine, in compliance with a communication path connection request made to the cell switching machine; and after setting up the virtual communication path, and before initiating user cell transmission through the virtual communication path, testing continuity of the virtual communication path by passing a maintenance cell through the virtual communication path.

According to the present invention, there is also provided a communication monitoring method for a cell switching machine, comprising the steps of: performing a maintenance cell loopback test on a virtual communication path by periodically inserting a maintenance cell in a flow of user cells being transmitted along the virtual communication path; when a fault condition is detected as a result of the maintenance cell loopback test, setting up an environment for achieving a peak cell rate by adding maintenance cells to the user cells; and measuring communication quality in the thus set-up peak cell rate environment.

According to the present invention, there is also provided a communication monitoring method for a cell switching machine, comprising the steps of: when a point-to-multipoint connection with a plurality of leaf points is set up in the cell switching machine, recording correspondence between each leaf point and a physical connection point in a table; when a maintenance cell loopback test request, designating a specific leaf point, is input from a maintenance console connected to the cell switching machine, determining the physical connection point corresponding to the specific leaf point by referring to the table; and performing a maintenance cell loopback test for the specific leaf point by allowing transmission of a maintenance cell only through the determined physical connection point.

According to the present invention, there is also provided a communication monitoring method for a cell switching machine, comprising the steps of: when a spare virtual communication path is set up in addition to a working virtual communication path, performing a cell continuity test on the spare virtual communication path; and when a fault condition is detected by the cell continuity test on the spare virtual communication path, outputting an alarm message to a maintenance console connected to the cell switching machine.

According to the present invention, there is also provided an apparatus for communication monitoring in a cell switching machine, comprising: means for setting up a virtual communication path, including a path within the cell switching machine, in compliance with a communication path connection request made to the cell switching machine; and means for, after setting up the virtual communication path, and before initiating user cell transmission through the virtual communication path, testing continuity of the virtual communication path by passing a maintenance cell through the virtual communication path.

According to the present invention, there is also provided an apparatus for communication monitoring in a cell switching machine, comprising: means for performing a maintenance cell loopback test on a virtual communication path by periodically inserting a maintenance cell in a flow of user cells being transmitted along the virtual communication path; means for, when a fault condition is detected as a result of the maintenance cell loopback test, setting up an environment for achieving a peak cell rate by adding maintenance cells to the user cells; and means for measuring communication quality in the thus set-up peak cell rate environment.

According to the present invention, there is also provided an apparatus for communication monitoring in a cell switching machine, comprising: means for, when a point-to-multipoint connection with a plurality of leaf points is set up in the cell switching machine, recording correspondence between each leaf point and a physical connection point in a table; means for, when a maintenance cell loopback test request, designating a specific leaf point, is input from a maintenance console connected to the cell switching machine, determining the physical connection point corresponding to the specific leaf point by referring to the table; and means for performing a maintenance cell loopback test for the specific leaf point by allowing transmission of a maintenance cell only through the determined physical connection point.

According to the present invention, there is also provided an apparatus for communication monitoring in a cell switching machine, comprising: means for, when a spare virtual communication path is set up in addition to a working virtual communication path, performing a cell continuity test on the spare virtual communication path; and means for, when a fault condition is detected by the cell continuity test on the spare virtual communication path, outputting an alarm message to a maintenance console connected to the cell switching machine.

BRIEF DESCRIPTION OF THE DRAWINGS

FIG. 1 is a simplified block diagram showing the configuration of an ATM switch according to the present invention;

FIG. 3 is a diagram showing a communication path connection sequence according to the present invention;

DESCRIPTION OF THE PREFERRED EMBODIMENTS

Figure 2A:
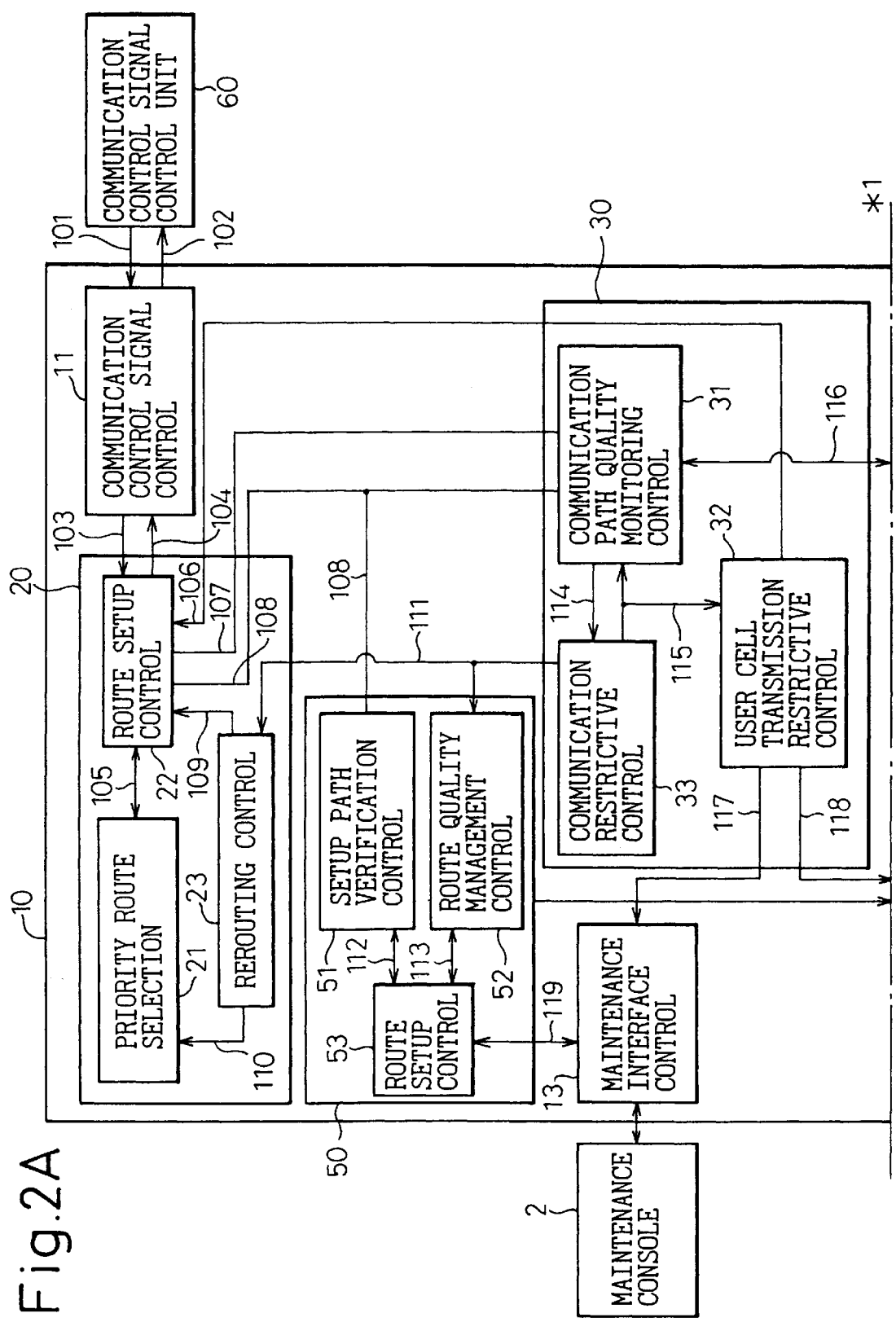
FIGS. 2A and 2B are a block diagram showing in further detail the configuration of the ATM switch according to the present invention.

FIG. 1 is a simplified block diagram showing the configuration of one example of an ATM switch equipped with a communication monitoring function according to the present invention. In FIG. 1, reference numeral 10 indicates an ATM switch functional block that performs various control functions of the ATM switch, and 14 designates an ATM switch block that performs cell switching. The ATM switch functional block 10 and the ATM switch block 14 together constitute the ATM switch 5. Further, reference numeral 2 is a maintenance console connected to the ATM switch functional block 10; 60 is a communication control signal control unit connected to the ATM switch functional block 10; 61 is an ATM line control unit, connected to the ATM switch block 14 and the ATM switch functional block 10, for connecting a subscriber terminal to the ATM switch or for connecting the ATM switch to another ATM switch; and 3 is a subscriber terminal (hereinafter simply called the terminal) connected to the ATM line control unit 61. In the figure, two ATM line control units 61 are shown, one on the root side (information sending side) and the other on the leaf side (information receiving side), but the number is not limited two.

In the ATM switch functional block 10, reference numeral 11 is a communication control signal control section, connected to the communication control signal control unit 60, for performing analysis of received communication control signals, such as a communication path connection request signal, and for controlling the reception and transmission of communication control signals; 20 is a routing control section, connected to the communication control signal control section 11, for selecting a route for a communication path and for setting up the path, based on the result of the analysis of the received communication control signal in response to the communication path connection request received from the communication control signal control unit 60; 30 is a quality monitoring control section for monitoring the quality of VC/PVC communication paths by using a PM function, etc.; 40 is an OAM cell control section for directing the ATM line control unit 61 designated as a test target to send out an OAM cell, and for receiving the result of the test from the ATM line control unit 61; 12 is an intraswitch path control section for controlling the setup/release of an intraswitch path connection between the inlet and outlet ATM line control units 61 when setting up or releasing a VC/PVC communication path; 13 is a maintenance interface control section connected to the maintenance console 2; and 50 is a PVC path control section for receiving a PVC path setup request from system administrator via the maintenance interface control section 13, and for selecting a route for the requested path and thus setting up the path.

When the ATM switch receives a communication path connection request signal from a subscriber line (UNI: user-node interface) via the communication control signal control unit 60, the routing control section 20 performs processing to set up a communication path connection to the requested destination (UNI) or to an intermediate switch node (NNI: network-node interface) on the way to the requested destination. When the routing destination is an NNI, a communication path verification request is made to the quality monitoring control section 30. Upon receiving the communication path verification request, the quality monitoring control section 30 issues a request to the OAM cell control section 40 to check cell continuity via an OAM cell loopback.

If the result of the cell continuity check is NG, the OAM cell control section 40 determines that user cell continuity may be affected, and sends a communication path fault notification to the quality monitoring control section 30, which in turn sends a route restrictive control notification to the routing control section 20. Upon receiving the route restrictive control notification, the routing control section 20 cuts off the route and selects an alternate route.

In this way, according to the present invention, by performing a cell continuity verification test on the intraswitch and interswitch communication paths prior to the initiation of user cell transmission when establishing a virtual path connection, a check can be made to verify whether the communication path is functioning properly.

A PVC communication path connection request from the administrator is input from the maintenance console 2, and is sent to the PVC path control section 50 via the maintenance interface control section 13. The PVC path control section 50 selects an intraswitch route for the requested communication path, and requests the intraswitch path control section 12 to set up the communication path along the selected route. After the path has been set up by the intraswitch path control section 12, the PVC path control section 50 activates the OAM cell control section 40 to perform a cell continuity check on the intraswitch path. The OAM cell control section 40 checks cell continuity through the path connection between the inlet and outlet ATM line control units 61 (within the switch) by issuing an OAM cell loopback request to the outlet (leaf-side) ATM line control unit 61 and an OAM cell send request to the inlet (root-side) ATM line control unit 61.

If an interswitch cell continuity verification request is contained in the PVC communication path connection request from the administrator, the PVC path control section 50 activates the OAM cell control section 40 in order to check cell continuity through to another ATM switch. The OAM cell control section 40 checks cell continuity between the ATM switches by requesting the outlet ATM line control unit 61 to send out an OAM cell having an attribute (Loopback Location ID/Segment End) identifying the site designated by the administrator as the loopback destination. If a fault condition is detected as a result of the cell continuity check, the PVC path control section 50 sends the check result via the maintenance interface control section 13 to the maintenance console 2 for display on a display to notify the administrator.

In this way, according to the present invention, by the cell continuity verification performed when establishing a PVC communication path, cell continuity through the intraswitch and interswitch communication paths can be checked prior to the initiation of user cell transmission, after completion of the path connection between the subscribers designated in the connection request by the administrator.

Furthermore, according to the present invention, an alarm message can be sent to the maintenance console 2 when the result of the cell continuity verification test turns out NG. By verifying cell continuity before the initiation of user cell transmission in this way, the possibility of a user cell transmission fault can be eliminated, while urging the administrator to perform maintenance checks on the faulty route and set up an alternate route.

When the selection of a VC route capable of functioning properly is completed with the above procedure, the routing control section 20 enables the communication path for use by the user, and requests the quality monitoring control section 30 to start monitoring the communication path. Likewise, when the selection of a PVC route capable of functioning properly is completed with the above procedure, the PVC path control section 50 enables the communication path for use by the user, and requests the quality monitoring control section 30 to start monitoring the communication path.

From the time that the request is received, the quality monitoring control section 30 controls the OAM cell control section 40, and periodically performs an OAM cell loopback and checks the quality of the communication path by analyzing the result. Since the OAM cell loopback is performed basically with one cell, if the result is NG, it does not immediately follow that the communication path quality (QOS: Quality of Service), as a statistic parameter, does not satisfy the required value. Therefore, when the result of the OAM cell loopback test with one cell is NG, the quality monitoring control section 30 measures the QOS by having OAM cells generated so that cells are transmitted through the path at the maximum cell rate allowed in the requested bandwidth (at PCR—peak cell rate) for a prescribed period of time. If the measured result does not satisfy the required QOS, communication path restrictive control is enforced. That is, the communication path is cut off, and a communication path fault message is sent to the maintenance console 2 via the maintenance interface control section 13, to notify the administrator accordingly. At the same time, the quality monitoring control section 30 sends a route restrictive control notification to the routing control section 20 and the PVC path control section 50. The routing control section 20 that received the route restrictive control notification enforces selection control by setting the priority of that route to the lowest level. On the other hand, the PVC path control section 50 that received the route restrictive control notification enforces control on new route selections and outputs an alarm message when the same route is selected through the maintenance console 2.

In this way, according to the present invention, a cell continuity verification test is performed periodically on the path operating in a virtual connection/permanent virtual connection communication state, and when the OAM loopback cell cannot be received correctly, the interval of the OAM cell loopback transmission is changed so that cells are transmitted at the peak cell rate, thus making it possible to monitor the communication quality.

Further, according to the present invention, when quality deterioration is detected during the communication quality monitoring test, a restriction is imposed on a new route selection along the deteriorated path that may be requested by a virtual connection subscriber, and an alternative route is preferentially selected in that case.

Moreover, according to the present invention, when quality deterioration is detected during the communication quality monitoring test, if a new permanent virtual connection request is made for the same path, an alarm message is output to the maintenance console, indicating that a communication fault has occurred on the communication path along the requested route.

Thus, according to the present invention, if a fault condition has occurred in cell transmission for some reason when the user is transmitting cells over a properly functioning route, since the cell continuity test is performed periodically, such communication faults can be notified to the administrator, and optimum route selection can be achieved automatically in response to a VC path setup request.

A description will now be given of a cell continuity verification test in point-to-multipoint communication between an ATM switch providing the point-to-multipoint connection and one or more ATM switches connected to it. The OAM cell control section 40 determines an ATM line control unit 61 corresponding to a specific leaf point designated by the administrator from among a plurality of leaf points, and requests the same control unit 61 to pass OAM cells therethrough. Then, a request is made to the root-side ATM line control unit 61 to send out an OAM cell. The OAM cell sent from the root-side ATM line control unit 61 arrives at the plurality of leaf points in the ATM switch, but is transmitted out only through the ATM line control unit 61 corresponding to that specific leaf point. Since the OAM cell transmission route is limited in this way, the location of a fault can be identified.

In this way, according to the present invention, the cell continuity test can be performed for a specific subscriber in point-to-multipoint communication.

The OAM cell control section 40 shown in FIG. 1 also has the function of ensuring the quality of a standby communication path (protection communication path) by periodically sending, for verification, an OAM cell to the ATM line control unit 61 providing the protection path. This has the effect of maintaining proper transmission of user cells when path switching is made to the protection communication path.

Figure 2B:
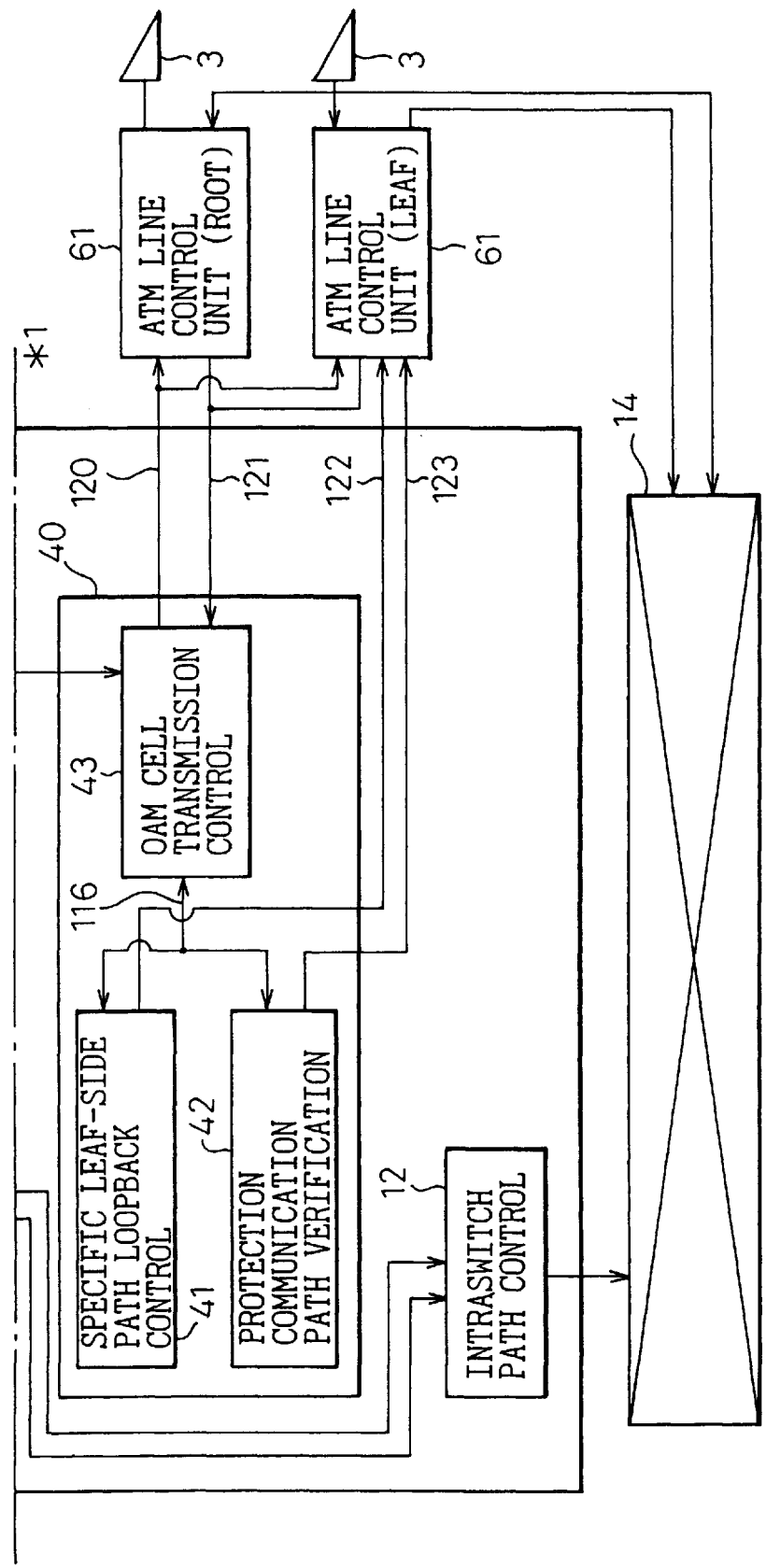

FIGS. 2A and 2B are a block diagram showing in further detail the configuration of the ATM switch according to the present invention. The same parts as those in FIG. 1 are designated by the same reference numerals, wherein 11 is a communication control signal control section having the function of analyzing a received communication control signal and controlling the reception and transmission of the communication control signal, and 12 is an intraswitch path control section for controlling the setup/release of an intraswitch path connection between the inlet and outlet ATM line control units 61 when setting up or releasing a VC/PVC communication path. More specifically, the intraswitch path control section 12 sets up a path within the ATM switch block 14. Reference numeral 2 designates a maintenance console which serves as an interface between the system administrator and the ATM switch functional block 10, and which, for example, takes various commands entered by the administrator and outputs response status for the commands as well as autonomous status from the ATM switch. The maintenance console 2 has a display (not shown) for displaying various kinds of information.

Reference numeral 60 is a communication control signal control unit connected to the communication control signal control section 11, 13 is a maintenance interface control section for interfacing the maintenance console 2 to the ATM switch functional block 10, and 61 is an ATM line control unit connected to the ATM switch block 14 and an OAM cell transmission control section 43. In the illustrated example, the ATM line control unit on the root side and the ATM line control unit on the leaf side are connected together, but the configuration is not limited to the illustrated one. Further, reference numeral 3 is a subscriber terminal connected to the associated ATM line control unit 61, and 14 is the ATM switch block, connected to the intraswitch path control section 12 and the ATM line control units 61, for setting up a path.

The routing control section 20 selects the routing destination based on the result of the analysis of the received communication control signal. In the routing control section 20, reference numeral 21 is a priority route selection section for selecting a high-quality route on a priority basis for a path when setting up a new path or rerouting a path, 22 is a route setup control section for controlling the setup of a VC route, and 23 is a rerouting control section for setting up a path along an alternate route selected by the priority route selection section 21 when a fault condition is detected by an OAM cell continuity check at the time of the path setup.

The PVC path control section 50 receives a PVC path setup request from the administrator via the maintenance interface control section 13, and sets up a path by selecting a route for the path. In the PVC path control section 50, reference numeral 51 is a setup path verification control section for checking the quality of the path by performing an OAM cell continuity check on the path when setting up the path, and for notifying the administrator if necessary, 52 is a route quality management control section for managing the result of the quality monitoring of the setup path, and 53 is a route setup control section for performing route setup control.

The quality monitoring control section 30 monitors the quality of a VC/PVC communication path by using a performance monitoring (PM) function, etc. In the quality monitoring control section 30, reference numeral 31 is a communication path quality monitoring control section which, when a communication path verification request is issued from the routing control section 20 or the PVC path control section 50, or during a period from the issuance of a monitor start request to the issuance of a monitor end request from the routing control section 20 or the PVC path control section 50, periodically performs an OAM cell continuity check on the communication path by using the OAM cell control section 40, monitors the quality of the communication path verified based on the result of the OAM cell continuity check, and analyses the result of the OAM cell continuity check, and when the control level is reached, issues a user cell restrictive control notification and a communication path fault notification; 32 is a user cell transmission restrictive control section which performs user cell transmission restrictive control (including, for example, cutting off the path) based on the user cell transmission restrictive control notification; and 33 is a communication restrictive control section which, when a fault is detected in the quality of the communication path, issues a notification to restrict the use of the line accommodating the communication path and also issues a reroute request notification.

The OAM cell control section 40 directs the ATM line control unit 61 designated as a test target to send out an OAM cell, and receives the result of the test from the same ATM line control unit 61. In the OAM cell control section 40, reference numeral 41 is a specific leaf-side path loopback control section which specifies a leaf-side line control unit on a point-to-multipoint connection, 42 is a protection communication path verification section which periodically requests transmission of an OAM cell for the verification of a protection communication path, and 43 is an OAM cell transmission control section, connected to the ATM line control unit 61, for controlling the transmission of the OAM cell.

Next, signals 101 to 123 shown in the figure will be explained. Signal 101 is an inlet-side communication control signal, 102 is an outlet-side communication control signal, 103 is inlet-side communication control signal information, 104 is outlet-side communication control signal information, 105 is a route selection instruction signal, 106 is a user cell transmission restrictive control notification signal, 107 is a monitor start/end notification signal, 108 is a communication path verification request signal, 109 is a reroute request signal, 110 is a route restrictive control request signal, 111 is a route restrictive control notification signal, 112 is a monitor start/end request signal, 113 is a route quality verification request signal, 114 is a restrictive control notification signal, 115 is a user cell restrictive control notification signal, 116 is an OAM cell send request/result signal, 117 is a communication path fault notification signal, 118 is a communication path cutoff request signal, 119 is a setup path fault notification signal, 120 is an OAM cell send request signal, 121 is a send result notification signal, 122 is an OAM cell pass request signal, and 123 is an OAM cell loopback request signal. The operation of the thus configured system will be described below.

The subscriber sends a communication path connection request from the terminal 3. This request is input to the ATM switch functional block 10 via the ATM line control unit 61, and is reported to the communication control signal control unit 60. The communication control signal control unit 60 reports the arrival of the communication path connection request signal 101, received from the subscriber line (UNI), to the communication control signal control section 11, which in response issues a connection request signal 103 to the route setup control section 22. Upon receiving the connection request signal, the route setup control section 22 sends a route selection instruction signal 105 to the priority route selection section 21, thereby activating the priority route selection section 21. The priority route selection section 21 then selects a priority route by referring to a priority information table; thereupon, the route setup control section 22 sends the outlet-side control signal information 104 to the communication control signal control section 11 to set up the selected route.

In the priority route selection section 21, a route is selected on a priority basis by using route selection information stored in the priority information table. The priority route selection section 21 has the table in which the route information is stored in priority order, as described above, and selects the desired route from this table. The route setup control section 22 first sets up a communication path along the selected route, and then activates the quality monitoring control section 30 to perform a cell continuity check on the communication path before enabling the path for use by the user. The path set up at this time is a connection from the inlet ATM line control unit 61 to the outlet ATM line control unit 61. That is, the intraswitch path control section 12 sets up a path in the ATM switch block 14, for connecting the inlet ATM line control unit 61 to the outlet ATM line control unit 61.

When the outlet ATM line is a UNI, the test cell sent from the inlet ATM line control unit 61 is passed through the ATM switch block 14 and enters the outlet ATM line control unit 61 at which the cell is looped back and returned to the inlet ATM line control unit 61 along the same route in the reverse direction. When the outlet ATM line is an NNI, the OAM cell sent from the inlet ATM line control unit 61 is passed through the ATM switch block 14 and through the outlet ATM line control unit 61, and is transmitted out toward an adjacent switch; the cell is then looped back from an ATM line control unit on the outlet (UNI) side of the switch accommodating the destination subscriber, and returned to the inlet ATM line control unit 61 along the same route in the reverse direction.

The inlet ATM line control unit 61 reports the result of the test to the quality monitoring control section 30. When there is a communication fault in the selected route, the quality monitoring control section 30 sends a route restrictive control notification signal 111 to the rerouting control section 23, thereby activating the rerouting control section 23. The rerouting control section 23 thus notified sends a route restrictive control request signal 110 to the priority route selection section 21 to set the priority of the failed route to the lowest level, and sends a reroute request signal 109 to the route setup control section 22.

When activated for setting an alternative route in response to the route selection instruction signal 105 sent from the route setup control section 22, the priority route selection section 21 selects a route based on route priority by referring to the internal table, and sends the information about the selected route to the route setup control section 22. Optimum route setup can thus be achieved.

The quality monitoring control section 30 sends an OAM cell transmission request signal 116, requesting the OAM cell transmission control section 43 to perform an OAM cell continuity test on the communication path, and performs various control operations by analyzing the result of the test. When a communication path verification request signal is received from the route setup control section 22, the communication path quality monitoring control section 31 requests a continuity/loopback test with a single OAM cell. When the result of the test is OK (that is, when the inlet ATM line control unit 61 was able to receive the looped back OAM cell), and when the transmission of user cells is not initiated yet, the communication path quality monitoring control section 31 sends a use permitted notification signal to the user cell transmission restrictive control section 32 by issuing a user cell control notification signal 115, thus permitting the transmission of user cells.

On the other hand, when the result of the test is NG (that is, when the ATM line control unit 61 was unable to receive the looped back OAM cell), a restrictive control notification signal 114 is sent to the communication restrictive control section 33 which, if the transmission of user cells is not initiated yet, sends a route restrictive control notification signal 111 to the rerouting control section 23, requesting the setting of an alternative route.

In the OAM cell control section 40, the OAM cell transmission control section 43 sends an OAM cell send request signal 120 to the ATM line control unit 61 accommodating the communication path under test. When the OAM cell send result notification signal 121 is received from the ATM line control unit 61, the OAM cell transmission control section 43 reports the result of the test to the quality monitoring control section 30.

FIG. 3 is a diagram showing an example of a communication path connection sequence according to the present invention. The sequence illustrates the operation when no faults are detected as the result of a cell continuity test. In the illustrated example, user 1 is connected to user 2 via switches $5_A$, $5_B$, and $5_C$. When a SETUP signal (a call setup request) from the user 1 is received by the switch $5_A$ (S1), the switch $5_A$ returns CALL PROC (reporting call setup process in progress) to the user 1 (S2). Next, the priority route selection 21 in the switch $5_A$ selects a route of high selection priority (S3). In this example, route B-1 is selected. The switch $5_A$ thus selects the route to the switch $5_B$, which then selects a route to the switch $5_C$ in like manner.

Then, the switch $5_A$ sends IAM (a call setup request) to the switch $5_B$ (S4), in response to which the switch $5_B$ returns IAA to the switch $5_A$ (S5), followed by ACM (address reception complete) (S6). Next, the switch $5_B$ sends IAM to the switch $5_C$ (S7), in response to which the switch $5_C$ returns IAA to the switch $5_B$ (S8), followed by ACM (S9). Then, the switch $5_C$ sends a SETUP message to the user 2 (S10), and the user 2 returns CALL PROC (S11), followed by CONN (S12). The switch $5_C$ sends ANM to the switch $5_B$ (S13), which then sends ANM (called party off hook) to the switch $5_A$. When the route is connected between the switch $5_A$ and switch $5_C$ in this manner, a continuity check start notification is sent from the switch $5_A$ toward the switch $5_C$ (S15). The continuity check start notification sent from the switch $5_A$ is relayed via the switch $5_B$ and delivered to the switch $5_C$ (S16).

Upon receiving the continuity check start notification, the switch $5_C$ returns an acknowledgement signal ACK to the switch $5_B$ (S17), and the switch $5_B$ returns the acknowledgement signal ACK to the switch $5_A$ (S18). The OAM cell transmission control section 43 in the switch $5_A$ that received the acknowledgement directs the ATM line control unit 61 to send out an OAM cell, and the OAM cell output from the ATM line control unit 61 is transmitted through the route to the switch $5_C$. The OAM cell then loops back from the switch $5_C$ and returns to the originating switch $5_A$ (S19).

The ATM line control unit 61 checks the quality of the returned OAM cell, and reports the result to the communication path quality monitoring control section 31 via the OAM cell transmission control section 43. The communication path quality monitoring control section 31 sends a continuity check end notification to the switch $5_B$ (S20), and the switch $5_B$ sends the continuity check end notification to the switch $5_C$ (S21). Next, the switch $5_C$ returns an acknowledgement signal ACK to the switch $5_B$ (S22), and the switch $5_B$ returns the acknowledgement signal ACK to the switch $5_A$ (S23). In the meantime, the switch $5_C$ sends CONN ACK to the user 2 (S24).

Since the proper functioning of the path prior to the initiation of user cell flow has been verified with the above sequence of operations, the system now initiates the sequence of operations to implement a user cell flow. Upon receiving the report that the route is functioning properly, the user cell transmission restrictive control section 32 sends a CONN signal to the user 1 (S25). When the user 1 returns CONN ACK to the switch $5_A$ in response to the connection request (S26), the path connection is completed between the user 1 and user 2, permitting user communication to be initiated with the transmission of user cells (S27). Thereafter, the communication path quality monitoring control section 31 periodically performs an OAM cell loopback test on the path established between the switch $5_A$ and switch $5_C$ (S28).

Figure 4:
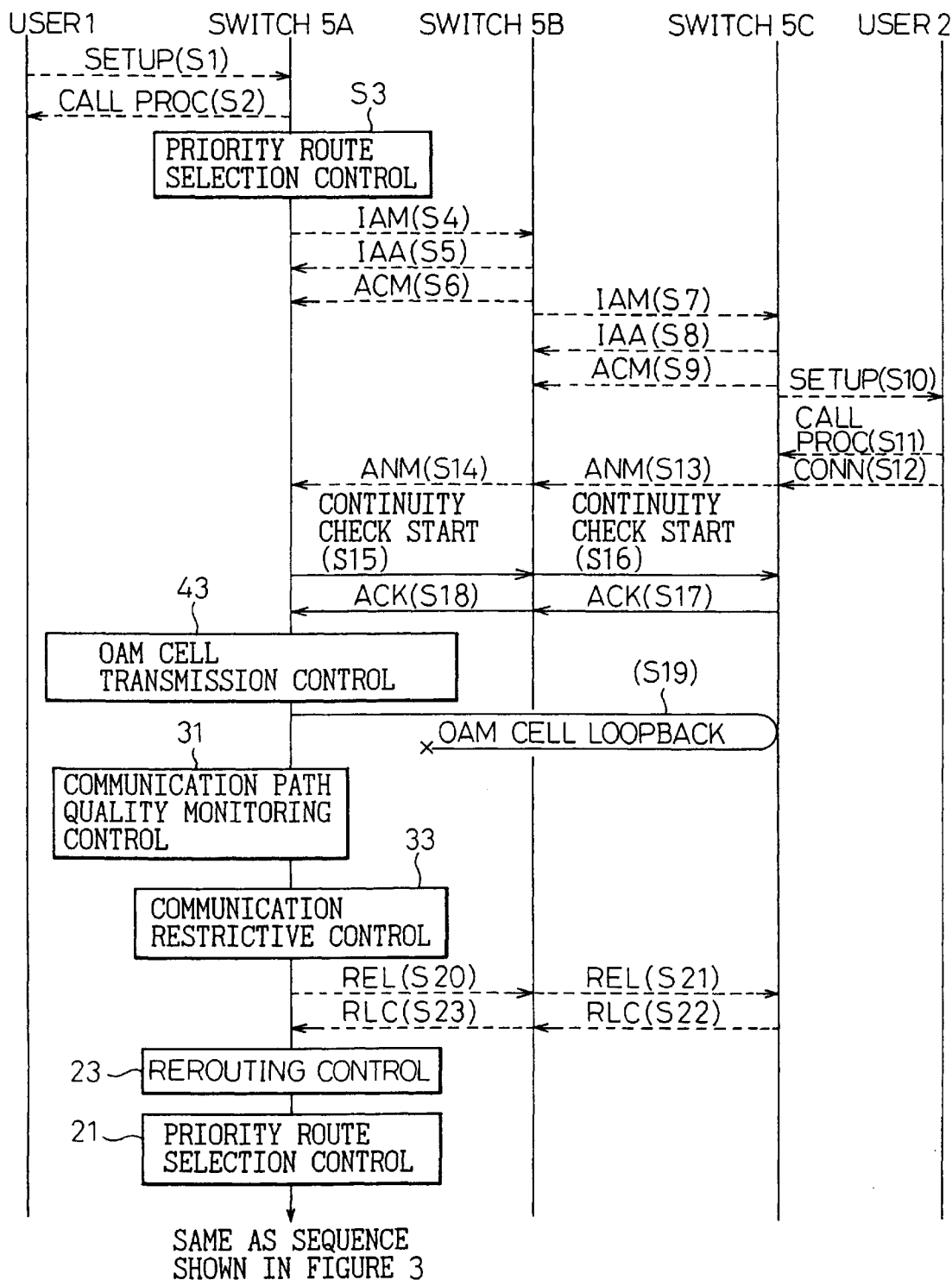
FIG. 4 is a diagram showing a communication path connection sequence when there is a failure in a route.

FIG. 4 is a diagram showing another example of the communication path connection sequence according to the present invention. The sequence illustrates the operation when a fault occurs in the route and rerouting is performed. The procedure up to the point where the path is set up between the switch $5_A$ and switch $5_C$ is the same as that shown in FIG. 3. The OAM cell transmission control section 43 activates the ATM line control unit 61 to perform an OAM cell loopback test from the ATM line control unit 61 to the ATM line control unit 61 in the switch $5_C$ to test the established path (S19). If the OAM cell fails to return to the originating ATM line control unit 61, the ATM line control unit 61 reports the failure to the communication path quality monitoring control unit 31 via the OAM cell transmission control section 43.

The communication path quality monitoring control unit 31 activates the communication restrictive control section 33. The communication restrictive control section 33 performs the processing to cut off the established path. That is, the switch $5_A$ sends REL to the switch $5_B$ (S20), and the switch $5_B$ sends REL to the switch $5_C$ (S21). In response, the switch $5_C$ returns response RLC to the switch $5_B$ (S22), and the switch $5_B$ returns the response RLC to the switch $5_A$ (S23). In this way, the route first established is cut off.

Next, the rerouting control section 23 activates the priority route selection section 21. The priority route selection section 21 updates the route selection information, and selects an alternative priority route stored in the internal table. An OAM cell continuity test is then performed on the alternative route thus selected. In the illustrated example, a change is made from route B-1 to route B-2. Priority selection logic can be changed as desired by the administrator so that the selection can be made appropriately in accordance with the interswitch distance, the number of routes between the switches, and the line bandwidth.

According to the present invention, by performing a cell continuity verification test on the intraswitch and interswitch communication paths prior to the initiation of user cell transmission when establishing a virtual path connection, a check can be made to verify whether the communication path is functioning properly.

When a PVC communication path setup request is made by the administrator using the maintenance console 2, the request is reported to the PVC path control section 50 via the maintenance interface control section 13. In the PVC path control section 50, the route setup control section 53 selects an intraswitch route used for the requested communication path, and requests the intraswitch path control section 12 to set up the communication path along the selected route. The intraswitch path control section 12 sets up the path within the ATM switch block 14 for connection between the ATM line control units 61.

After the path has been set up by the intraswitch path control section 12, the route setup control section 53 sends a monitor request signal 112 to the setup path verification control section 51, requesting a cell continuity check to be performed on the path thus set up. The setup path verification control section 51 activates the quality monitoring control section 30 to verify cell continuity through the intraswitch path. If an interswitch cell continuity verification request is contained in the PVC communication path setup request from the administrator, the quality monitoring control section 30 is activated to verify cell continuity between the switches.

The route quality management control section 52 reports the result of the communication path cell continuity check to the route setup control section 53 by sending a route quality verification request signal 113. When the result of the cell continuity check indicates the detection of a fault, the route setup control section 53 reports the cell continuity fault by sending a setup path fault notification signal 119 to the maintenance console 2 via the maintenance interface control section 13. Further, the route quality management control section 52 is activated by the route restrictive control notification signal 111 sent from the quality monitoring control section 30, and limits the use of the failed route.

The communication path quality monitoring control section 31 in the quality monitoring control section 30 issues an OAM cell send request (PVC intraswitch path verification) when verifying the intraswitch path, and an OAM cell send request (PVC interswitch cell continuity check) when verifying interswitch cell continuity, by sending an OAM cell send request signal 116 to the OAM cell control section 40. A cell continuity path is thus set up between the ATM line control units 61, and a cell continuity test is performed. At this time, the cell continuity route is set up within the ATM switch block 14, connecting the root-side ATM line control unit 61 to the leaf-side ATM line control unit 61. The result of the test is reported to the communication path quality monitoring control section 31. When the quality checks OK (that is, when the ATM line control unit 61 was able to receive the looped back OAM cell), and when the transmission of user cells is not initiated yet, then the communication path quality monitoring control section 31 sends a use permitted notification to the user cell transmission restrictive control section 32 by issuing a user cell control notification signal 115, thus permitting the transmission of user cells.

On the other hand, when the result of the test is NG (that is, when the ATM line control unit 61 was unable to receive the looped back OAM cell), the communication path quality monitoring control section 31 sends a restrictive control notification signal 114 to the communication restrictive control section 33. Thereupon, the communication restrictive control section 33 sends a route restrictive control notification signal 111 to the route quality management control section 52.

In the case of PVC intraswitch path verification, the OAM cell transmission control unit 43 in the OAM cell control unit 40 checks cell continuity through the path (within the switch) between the inlet and outlet ATM line control units 61 by issuing an OAM cell loopback request to the outlet ATM line control unit 61 and an OAM cell pass request to the inlet ATM line control unit 61. In the case of a PVC interswitch cell continuity check, cell continuity between the switches is checked by requesting the outlet ATM line control unit 61 to send out an OAM cell having an attribute (Loopback Location ID/Segment End) identifying the site designated by the administrator as the loopback destination.

In this way, according to the present invention, by the cell continuity verification performed when establishing a PVC communication path, cell continuity through the intraswitch and interswitch communication paths can be checked prior to the initiation of user cell transmission, after completion of the path connection between the subscribers designated in the connection request by the administrator.

Furthermore, according to the present invention, an alarm message can be sent to the maintenance console 2 when the result of the cell continuity verification test turns out NG. By verifying cell continuity before the initiation of user cell transmission in this way, the possibility of a user cell transmission fault can be eliminated, while urging the administrator to perform maintenance checks on the faulty route and set up an alternate route.

When the selection of a VC route capable of functioning properly is completed with the above sequence of operations, the route setup control section 22 in the routing control section 20 sends a signal 107 requesting the quality monitoring control section 30 to start monitoring the communication path. Likewise, when the selection of a PVC route capable of functioning properly is completed with the above sequence of operations, the setup path verification control section 51 in the PVC path control section 50 sends a signal 108 requesting the quality monitoring control section 30 to start monitoring the communication path.

When quality deterioration is reported as a result of the communication path monitoring, the communication restrictive control section 33 in the quality monitoring control section 30 sends a route restrictive control notification signal 111 to the route quality management control section 52. When this signal is received after the initiation of user cell transmission, the route quality management control section 52 limits the use of the deteriorated route. When a quality verification request signal 113 requesting quality verification of the same route is received from the route setup control section 53 when setting up a new PVC path, the route quality management control section 52 sends a quality deterioration notification signal 113 to the route setup control section 53 which is thus notified of the quality deterioration of that route. The route setup control section 53 thus notified reports the quality deterioration of that route to the administrator by producing a display on the maintenance console 2 via the maintenance interface control section 13.

Upon receiving the above request, the communication path quality monitoring control section 31 in the quality monitoring control section 30 requests the OAM cell control section 40 to perform a continuity/loopback test with a single OAM cell at regular intervals of time, the process being repeated until a monitor end request is received. As already noted, since the OAM cell loopback is performed basically with one cell, if the result is NG, it does not immediately follow that QOS (the allowable ratio of lost cells to transmitted cells) as a statistic parameter does not satisfy the required value. Therefore, the communication path quality monitoring control section 31 sends an OAM cell send request (maximum bandwidth continuity request) 116 to the OAM cell transmission control section 43 in the OAM cell control section 40 so that cells are transmitted through the path using the maximum requested bandwidth (at peak cell rate or PCR) for a prescribed length of time. The OAM cell transmission control section 43 issues a cell flow test instruction to the ATM line control unit 61. A cell loopback test is thus performed with cells generated from the inlet ATM line control unit 61 toward the outlet ATM line control unit 61. The number of OAM cells to be generated at this time is chosen so that the cell rate of the OAM cells combined with the user cells becomes equal to the peak cell rate.

The inlet ATM line control section 61 counts the number of the returned loopback cells, and reports the count to the communication path quality monitoring control section 31 via the OAM cell transmission control section 43. The communication path quality monitoring control section 31 determines whether the lost cell count satisfies the required QOS value. If the required QOS is not satisfied, then it is determined that quality deterioration has occurred in the communication path. In that case, a restrictive control request signal 114 is sent to the communication restrictive control section 33.

The communication restrictive control section 33 sends a user cell restrictive control signal 115 to the user cell transmission control section 32. The user cell transmission control section 32 sends a communication fault signal 117 indicating the occurrence of a fault in the communication path, to the maintenance console 2 via the maintenance interface control section 13 to produce a display thus notifying the administrator accordingly. At the same time, a path cutoff request signal 118 is sent to the intraswitch path control section 12 to cut off the path. The path set up in the ATM switch is thus cut off. The communication restrictive control section 33 also sends a route restrictive control signal 111 to the rerouting control section 23 and the route quality management control section 52.

When the OAM cell send request (maximum bandwidth continuity request) 116 is received, the OAM cell transmission control section 43 sends an OAM cell send request (maximum bandwidth continuity request) 120 to the ATM line control unit 61 so that cells are transmitted through the communication path using the maximum requested bandwidth for a prescribed length of time. The ATM line control unit 61 sets up an environment for the communication path to achieve cell transmission with the peak cell rate by adding OAM cells to the user cells being transmitted through it. In the thus set environment, the ATM line control unit 61 measures the cell loss ratio in the OAM cells, and reports the result to the OAM cell transmission control section 43 by sending a send result signal 121. The OAM cell transmission control section 43 reports the received cell loss ratio to the communication path quality monitoring control section 31.

In this way, according to the present invention, a cell continuity test is performed periodically on the path operating in a virtual connection/permanent virtual connection communication state, and when the OAM loopback cell cannot be received correctly, a peak cell rate environment is created by changing the OAM loopback cell transmission interval, thereby making it possible to monitor the communication quality in that environment.

Further, according to the present invention, when quality deterioration is detected during the communication quality monitoring test, a restriction is imposed on a new route selection along the deteriorated path that may be requested by a virtual connection subscriber, and an alternative route is preferentially selected in that case.

Moreover, according to the present invention, when quality deterioration is detected during the communication quality monitoring test, if a new permanent virtual connection request is made for the same path, an alarm message is output to the maintenance console, indicating that a communication fault has occurred on the communication path along the requested route.

Thus, according to the present invention, if a fault condition has occurred in cell transmission for some reason when the user is transmitting cells over a properly functioning route, since the cell continuity test is performed periodically, such communication fault can be notified to the administrator, and optimum route selection can be achieved automatically.

Figure 5:
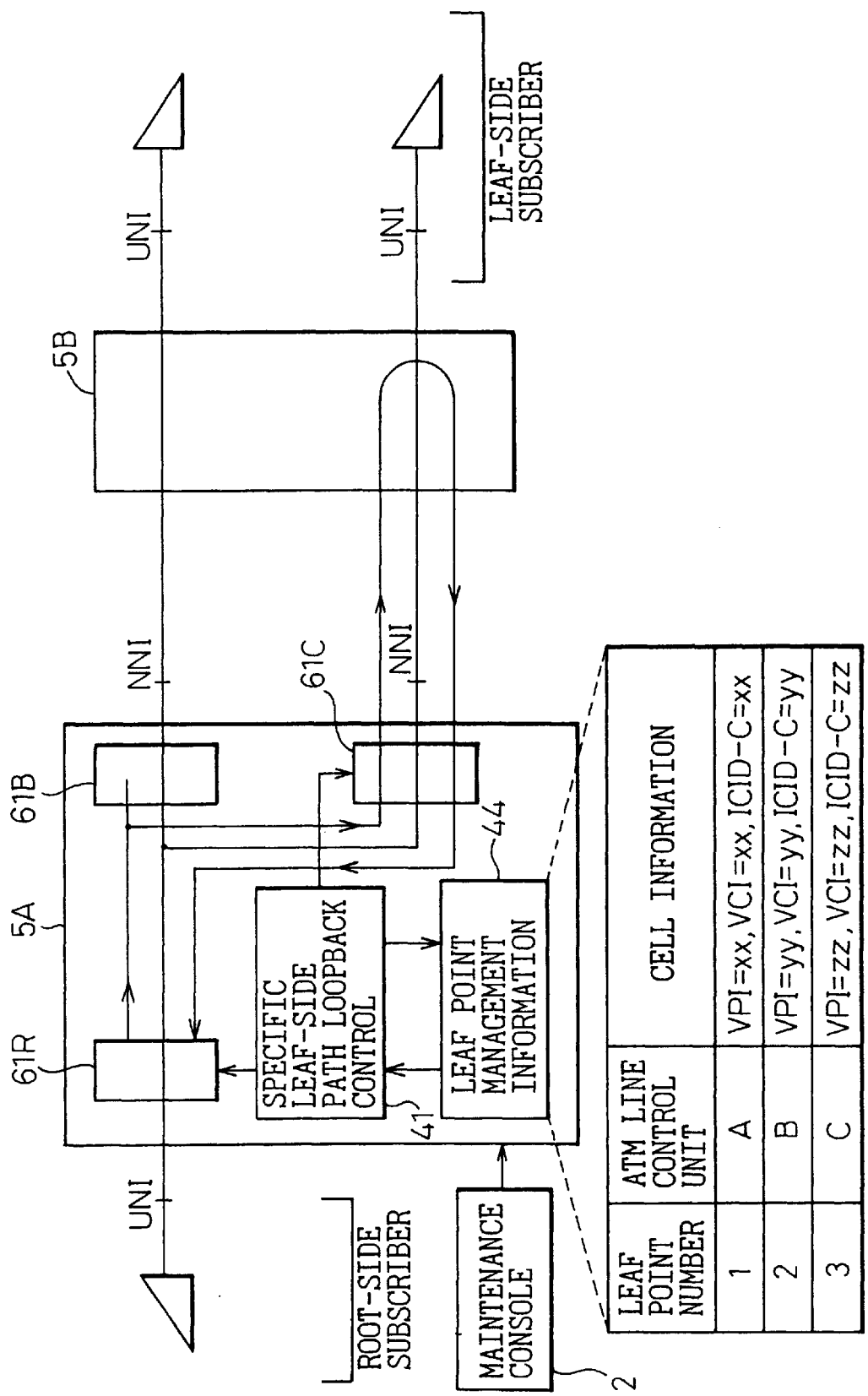
FIG. 5 is a diagram showing a connection test in a point-to-multipoint connection according to the present invention.

FIG. 5 is a diagram for explaining the point-to-multipoint communication control according to the present invention. The same parts as those in FIGS. 2A and 2B are designated by the same reference numerals. When a command is entered from the maintenance console 2 connected to the switch $5_A$ providing the point-to-multipoint connection, the specific leaf-side path loopback control section 41 determines the ATM line control unit 61 ($61_C$ in FIG. 5) corresponding to the leaf point designated by the administrator, by referring to a leaf point management information table 44, and acquires cell information (unique value (ICID-C) to VPI/VCI or leaf path). The leaf point management table 44 consists of leaf point number, ATM line control unit number, and cell information, as shown in FIG. 5. The specific leaf-side path loopback control section 41 instructs the thus determined leaf-side ATM line control unit $61_C$ to pass an OAM cell therethrough, and requests the root-side ATM line control unit 61 to send out an OAM cell having the above cell information. The OAM cell sent from the root-side ATM line control unit $61_R$ arrives at the leaf-side ATM line control units $61_B$ and $61_C$, but is passed only through the ATM line control unit $61_C$ instructed to pass the cell therethrough, and looped back and returned by the leaf point in the switch $5_B$.

The leaf point management table 44 is updated by the specific leaf-side path loopback control section 41 each time a leaf-side subscriber is set. OAM cell loopback control for each specific subscriber is thus made possible by mapping the leaf point numbers one for one to the leaf-side subscribers.

Figure 6:
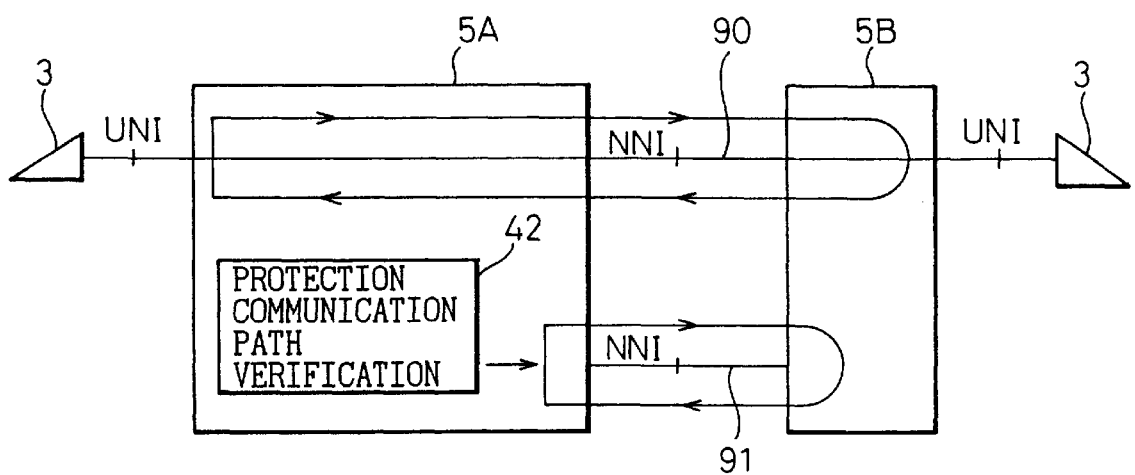
FIG. 6 is a diagram showing verification of a spare communication path according to the present invention.

FIG. 6 is a diagram for explaining the verification of a protection communication path according to the present invention. In the figure, a loop for a cell continuity check is formed through the working communication path 90 between the switch $5_A$ and switch $5_B$, and cell continuity is monitored by the communication path quality monitoring control section 31. To check cell continuity through the protection communication path 91, the protection communication path verifying section 42 manages control information concerning the protection communication path 91 corresponding to the working communication path 90. Normally, monitoring control is performed only when the working communication path is operating properly. When a fault condition is detected during the monitoring operation, a message indicating the occurrence of the fault is autonomously output, thus reporting an alarm to the administrator.

In this way, according to the present invention, the quality of the standby communication path (protection communication path) can be assured by periodically sending for verification an OAM cell to the protection circuit, and proper transmission of user cells can be maintained even if the path is switched to the protection communication path.

What is claimed is:

1. A communication monitoring method for a cell switching machine, comprising the steps of:
    (a) setting up a virtual communication path, including a path within the cell switching machine, in compliance with a communication path connection request made by a user to the cell switching machine; and
    (b) testing continuity of the virtual communication path by transmitting from the cell switching machine a maintenance cell through the virtual communication path after setting up the virtual communication path and before initiating user cell transmission through the virtual communication path.

2. A method according to claim 1, wherein the communication path connection request in step (a) is issued to set up a virtual connection between an originating terminal and a destination terminal in compliance with a request from the originating terminal, and further comprising the steps of
    cutting off the virtual communication path set up in step (a) and setting up a new virtual communication path along an alternative route when a fault condition is detected as a result of the virtual path communication path continuity test in step (b).

3. A method according to claim 1, wherein the communication path connection request in step (a) is input from a maintenance console connected to the cell switching machine, to set up a permanent virtual connection between terminals, and further comprising the step of
    outputting an alarm message to the maintenance console when a fault condition is detected as a result of the virtual path communication path continuity test in step (b).

4. A communication monitoring method for a cell switching machine, comprising the steps of:

(a) performing a maintenance cell loopback test on a virtual communication path by periodically inserting a maintenance cell in a flow of user cells being transmitted along the virtual communication path;

(b) setting up an environment for achieving a peak cell rate by adding maintenance cells to the user cells when a fault condition is detected as a result of the maintenance cell loopback test in step (a); and (c) measuring communication quality in the thus set-up peak cell rate environment.

5. A method according to claim 4, further comprising the steps of:

(d) determining whether the communication quality measured in step (c) satisfies a required value; and (e) lowering priority of the virtual communication path so that the virtual communication path will not be selected when a virtual connection request is made from an originating terminal, when the communication quality does not satisfy the required value.

6. A method according to claim 4, further comprising the steps of:

(d) determining whether the communication quality measured in step (c) satisfies a required value; and (e) outputting an alarm message to a maintenance console when a permanent virtual connection setup request is input from the maintenance console connected to the cell switching machine for the virtual communication path that failed to satisfy the required value.

7. A communication monitoring method for a cell switching machine, comprising the steps of:

(a) recording correspondence between each leaf point and a physical connection point in a table when a point-to-multipoint connection with a plurality of leaf points is set up in the cell switching machine;

(b) determining the physical connection point corresponding to a specific leaf point by referring to the table when a maintenance cell loopback test request, designating the specific leaf point, is input from a maintenance console connected to the cell switching machine; and (c) performing a maintenance cell loopback test for the specific leaf point by allowing transmission of a maintenance cell only through the determined physical connection point.

8. An apparatus for communication monitoring in a cell switching machine, comprising:

means for setting up a virtual communication path, including a path within the cell switching machine, in compliance with a communication path connection request made by a user to the cell switching machine; and means for, after setting up the virtual communication path, and before initiating user cell transmission through the virtual communication path, testing continuity of the virtual communication path by transmitting from the cell switching machine a maintenance cell through the virtual communication path.

9. An apparatus according to claim 8, wherein the communication path connection request is issued to set up a virtual connection between an originating terminal and a destination terminal in compliance with a request from the originating terminal, and further comprising means for, when a fault condition is detected as a result of the virtual path communication path continuity test, cutting off the set-up virtual communication path and setting up a new virtual communication path along an alternative route.

10. An apparatus according to claim 8, wherein the communication path connection request is input from a maintenance console connected to the cell switching machine, to set up a permanent virtual connection between terminals, and further comprising means for, when a fault condition is detected as a result of the virtual path communication path continuity test, outputting an alarm message to the maintenance console.

11. An apparatus for communication monitoring in a cell switching machine, comprising:

means for performing a maintenance cell loopback test on a virtual communication path by periodically inserting a maintenance cell in a flow of user cells being transmitted along the virtual communication path;

means for, when a fault condition is detected as a result of the maintenance cell loopback test, setting up an environment for achieving a peak cell rate by adding maintenance cells to the user cells; and means for measuring communication quality in the thus set-up peak cell rate environment.

12. An apparatus according to claim 11, further comprising:

means for determining whether the measured communication quality satisfies a required value; and means for, when the communication quality does not satisfy the required value, lowering priority of the virtual communication path so that the virtual communication path will not be selected when a virtual connection request is made from an originating terminal.

13. An apparatus according to claim 11, further comprising:

means for determining whether the measured communication quality satisfies a required value; and means for, when a permanent virtual connection setup request is input from a maintenance console connected to the cell switching machine for the virtual communication path that failed to satisfy the required value, outputting an alarm message to the maintenance console.

14. An apparatus for communication monitoring in a cell switching machine, comprising:

means for, when a point-to-multipoint connection with a plurality of leaf points is set up in the cell switching machine, recording correspondence between each leaf point and a physical connection point in a table;

means for, when a maintenance cell loopback test request, designating a specific leaf point, is input from a maintenance console connected to the cell switching machine, determining the physical connection point corresponding to the specific leaf point by referring to the table; and means for performing a maintenance cell loopback test for the specific leaf point by allowing transmission of a maintenance cell only through the determined physical connection point.

* * * * *